United States Patent [19]
Duell et al.

[11] Patent Number: 4,910,519
[45] Date of Patent: Mar. 20, 1990

[54] ELECTRONIC VOLUME CORRECTORS

[75] Inventors: Andreas A. G. Duell, Oakville; Ignacy J. Grzeslo, Mississauga, both of Canada

[73] Assignee: Romet Limited, Mississauga, Canada

[21] Appl. No.: 188,371

[22] Filed: Apr. 29, 1988

[30] Foreign Application Priority Data
Oct. 1, 1987 [CA] Canada .................................. 548424

[51] Int. Cl.⁴ .............................................. H03M 1/60
[52] U.S. Cl. .................................. 341/157; 73/861.03; 364/571.02; 377/21
[58] Field of Search ............... 341/155, 132, 118, 119, 341/120, 157; 364/510, 556–558, 564, 571.03, 571.02; 73/708, 765, 766, 861, 861.03, 861.01, 861.02

[56] References Cited
U.S. PATENT DOCUMENTS

| | | | |
|---|---|---|---|
| 3,895,529 | 7/1975 | Moore | 73/861.03 |
| 4,093,871 | 6/1978 | Plumb et al. | 73/861.03 |
| 4,238,825 | 12/1980 | Geery | 73/861.03 |
| 4,390,956 | 6/1983 | Cornforth et al. | 364/510 |
| 4,404,638 | 9/1983 | Yada et al. | 364/510 |
| 4,663,977 | 5/1987 | Vander Heyden | 364/510 X |

Primary Examiner—William M. Shoop, Jr.
Assistant Examiner—Brian K. Young
Attorney, Agent, or Firm—Darcy, Donovan & Coleman

[57] ABSTRACT

To obtain better accuracy, it is known to modify the mechanical metered volume reading of the flow through a gas pipeline according to the gas laws, which incorporate the pressure and temperature parameters of the gas. The present invention samples those parameters with analog sensors and inputs them into an analog to digital converter. The digital output from the converter is employed to obtain a more accurate digital volume reading.

25 Claims, 6 Drawing Sheets

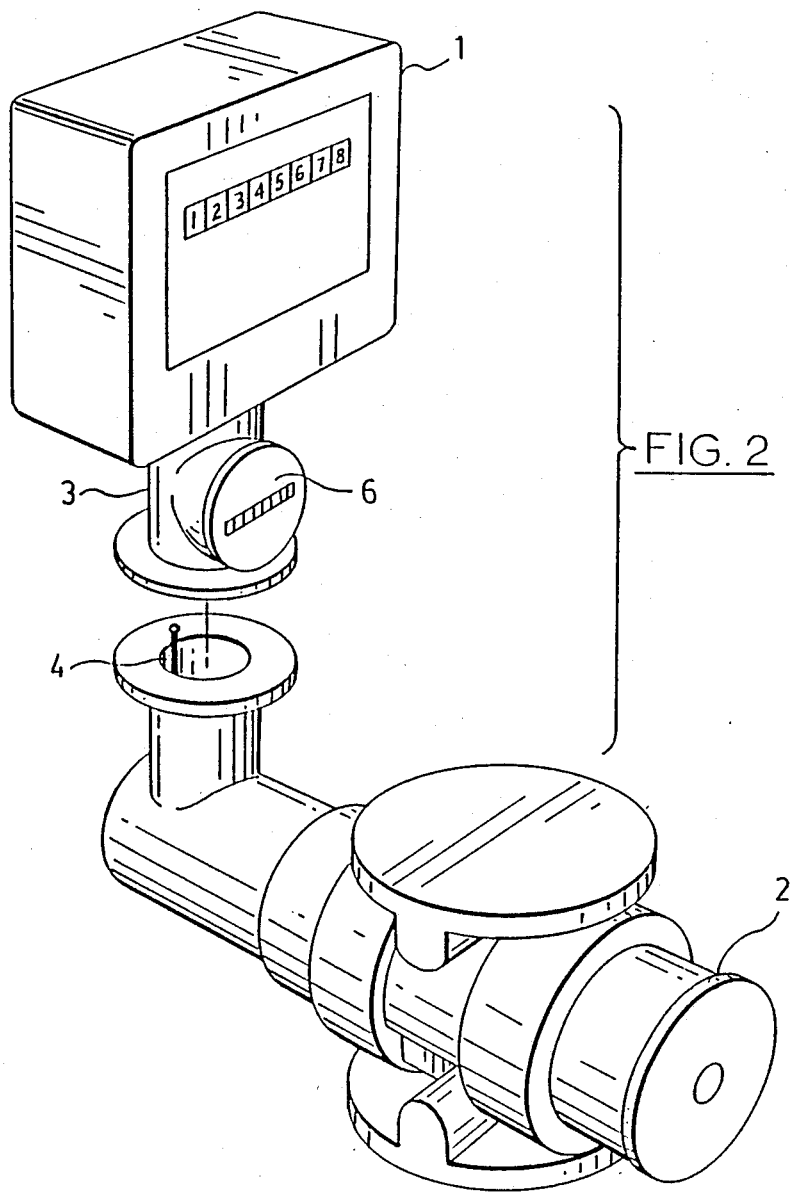

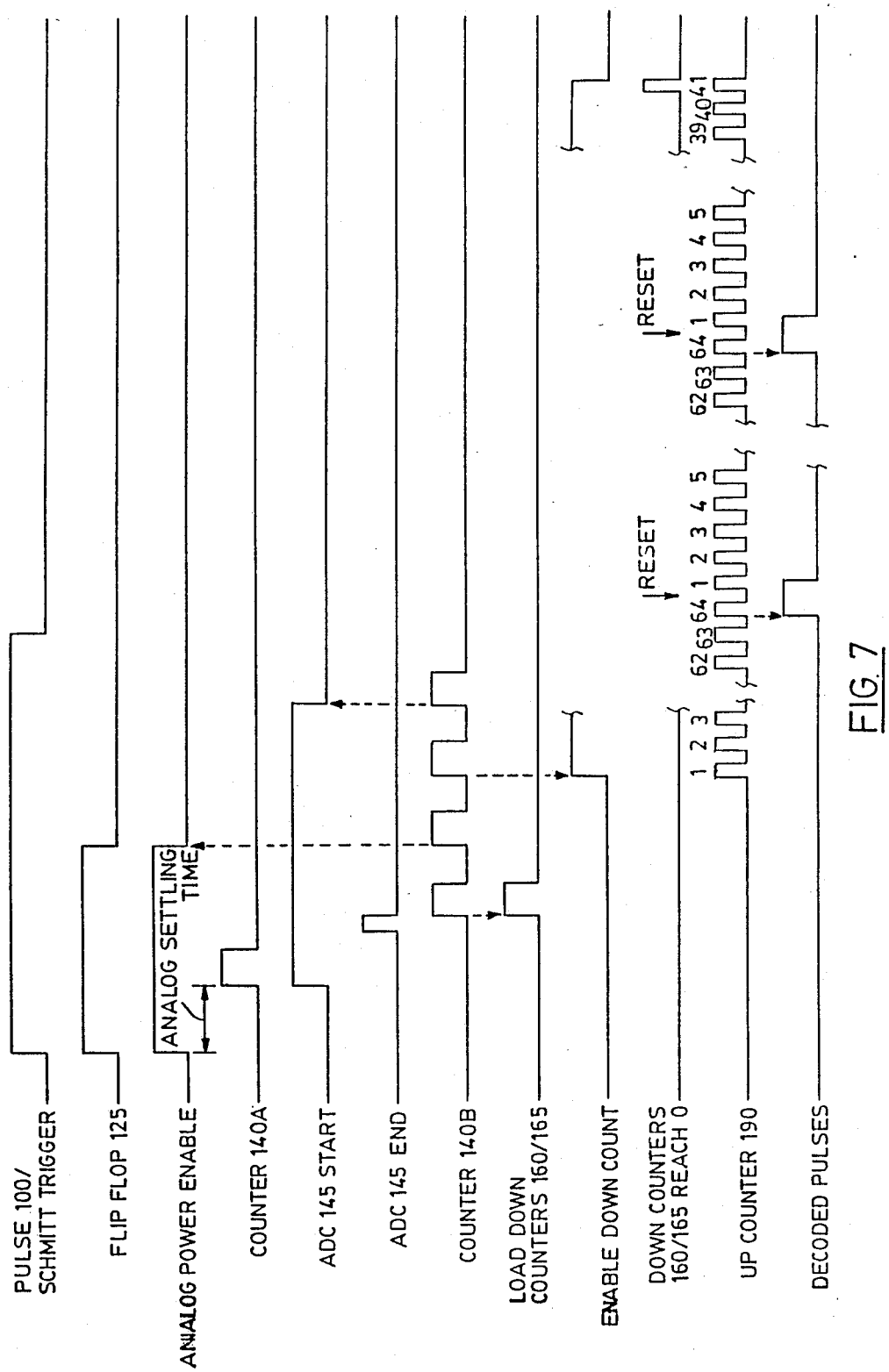

ELECTRONIC VOLUME CORRECTORS

TECHNICAL FIELD

This invention relates to electronic devices for the correction of conventional gas meters, such as positive displacement rotary, turbine or diaphragm meters.

BACKGROUND OF THE INVENTION

Conventional gas meters which measure the volume of flowing gas by mechanical means require correction because they do not take into account the effect of pressure and temperature on volume. Specifically, the combination of Charles and Boyle's laws, supplemented by a supercompressibility factor, indicates that the volume is more accurately given by:

$$V = Vm / \times (Pm/Pb) \times (Tb/Tm) \times Z$$

where
- $Vm$ is the measured uncorrected volume obtained from the meter at line pressure and line temperature,
- $Pm$ is the measured line pressure of the flowing gas,
- $Tm$ is the measured line temperature of the flowing gas,
- $Pb$ is the base pressure of 14.73 psia or other value in absolute units, depending on the applicable protocol,
- $Tb$ is the base temperature of 60 degrees F. in absolute units, or other value, depending on the applicable protocol, and
- $Z$ is the square of the supercompressibility factor.

The present invention is directed to a simple method of calculating the corrected volume according to the above formula, and to a compact, low power device for carrying out that method.

Electronic volume correction devices are typically employed in remote and harsh environments which demand special accomodation. Safety is a primary consideration, so that the electrical and thermal power of such devices should be minimized to reduce the possibility of igniting the gas. The employment of microprocessors and memories, as found in some devices, are more costly and require more power than the present invention. The employment of analog dividers for obtaining the ratio Pm/Tm, as found in some devices, requires extra circuitry and power to maintain stability in varying ambient conditions. Furthermore, for battery powered devices in remote areas, it is advantageous to minimize power consumption to reduce the frequency of manual replacement of batteries. It is therefore desirable to have a reliable electronic device manufactured from a minimum of inexpensive components which consume little power.

SUMMARY OF THE INVENTION

According to the present invention, there is provided an electronic device for correcting a gas meter which generates a sequence of analog flow pulses proportional to the uncorrected, mechanically measured flow of gas therethrough, comprising: (a) flow input means, connected to the gas meter, for receiving an analog flow pulse; (b) pressure indicating means, exposed to the gas, connected to the gas meter, and responsive to the analog flow pulse, for measuring the pressure of the gas and generating a first analog signal proportional to the absolute value thereof; (c) temperature indicating means, exposed to the gas, connected to the gas meter, and responsive to the analog flow pulse, for measuring the temperature of the gas and generating a second analog signal proportional to the absolute value thereof; (d) an analog to digital converter ("ADC"), responsive to the analog flow pulse and having: (i) first input means, connected to the pressure indicating means, for accepting the first analog signal; (ii) second input means, connected to the temperature indicating means, for accepting the second analog signal, wherein the second input means, normally being the reference input to the ADC, is adapted to accept a varying input; and (iii) conversion means, connected to the first and the second input means, for producing a digital output proportional to the quotient of the first analog signal and the second analog signal; and (e) conversion means, connected to the ADC and responsive to the digital output for converting the digital output to produce a sequence of corrected volume pulses proportional to the measured flow and corrected for temperature and pressure.

According to the present invention, there is also provided an electronic device for correcting a gas meter which generates a sequence of analog flow pulses proportional to the uncorrected, mechanically measured flow of gas therethrough, comprising: (a) flow input means, connected to the gas meter, for receiving an analog flow pulse; (b) pressure indicating means for generating a preselected constant first analog signal; (c) temperature indicating means, exposed to the gas, connected to the gas meter, and responsive to the analog flow pulse, for measuring the temperature of the gas and generating a second analog signal proportional to the absolute value thereof; (d) an analog to digital converter ("ADC"), responsive to the analog flow pulse and having: (i) first input means, connected to the pressure indicating means, for accepting the first analog signal; (ii) second input means, connected to the temperature indicating means, for accepting the second analog signal, wherein the second input means, normally being the reference input to the ADC, is adapted to accept a varying input; and (iii) conversion means, connected to the first and the second input means, for producing a digital output proportional to the quotient of the first analog signal and the second analog signal; and (e) conversion means, connected to the ADC and responsive to the digital output for converting the digital output to produce a sequence of corrected volume pulses proportional to the measured flow and corrected for temperature and pressure.

According to the present invention, there is further provided an electronic device for correcting a gas meter which generates a sequence of analog flow pulses proportional to the uncorrected, mechanically measured flow of gas therethrough, comprising: (a) flow input means, connected to the gas meter, for receiving an analog flow pulse; (b) pressure indicating means, exposed to the gas, connected to the gas meter, and responsive to the analog flow pulse, for measuring the pressure of the gas and generating a first analog signal proportional to the absolute value thereof; (c) temperature indicating means for generating a preselected constant second analog signal; (d) an analog to digital converter ("ADC"), responsive to the analog flow pulse and having: (i) first input means, connected to the pressure indicating means, for accepting the first analog signal; (ii) second input means, connected to the temperature indicating means, for accepting the second analog signal, wherein the second input means, normally being the reference input to the ADC, is adapted to accept a varying input; and (iii) conversion means, connected to the first and the second input means, for producing a digital output proportional to the quotient of the first analog signal and the second analog signal; and (e) conversion means, connected to the ADC and responsive to the digital output for converting the digital output to produce a sequence of corrected volume pulses proportional to the measured flow and corrected for temperature and pressure.

According to the present invention, there is also provided a method for correcting a mechanical gas meter which provides a measure of the volume of the flow of gas, comprising the steps of: (a) receiving the measure and generating a sequence of analog flow pulses proportional thereto; (b) measuring the pressure of the gas and generating a first analog signal proportional to the value thereof; (c) measuring the temperature of the gas and generating a second analog signal proportional to the value thereof; (d) in response to the analog flow pulses, producing a sequence of digital signals corresponding to the quotient of the first analog signal and the second analog signal, by means of an analog to digital converter ("ADC"), wherein the first analog signal is inputted at the normal input of the ADC and the second analog signal is inputted at the reference input to the ADC, which is adapted to accept a varying analog input signal; (e) converting the sequence of digital signals to correspond to preselected base temperature and pressure conditions; and (f) displaying the converted sequence of digital signals.

BRIEF DESCRIPTION OF THE DRAWINGS

A preferred embodiment of the correction device, in accordance with the invention, will now be described in conjunction with the following drawings, in which:

FIG. 2 is a split front perspective view of the correction device of the invention, employed with a conventional gas meter and electro-mechanical adaptor;

FIG. 7 is a timing diagram of the operation of the system during one cycle of the electro-mechanical adaptor;

DESCRIPTION OF A PREFERRED EMBODIMENT

Figure 1:
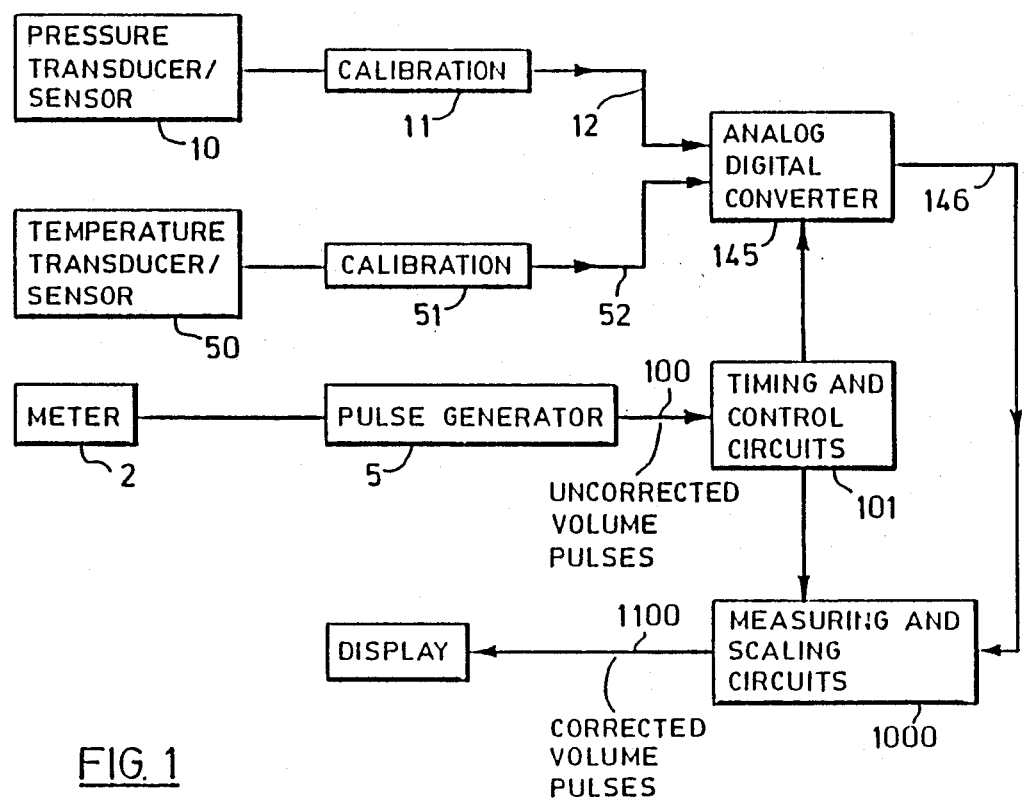
FIG. 1 is a functional block diagram of the system of the invention.

In FIG. 1, a simplified flow chart illustrates the basic operation of the system. The uncorrected volume of gas flow is measured by meter 2, which drives a pulse generator 5, which in turn generates repetitive pulses 100 representing the uncorrected volume. Pulses 100 drive timing and control circuits 101, which control analog-digital converter ADC 145 and measuring and scaling circuits 1000. The outputs of sensors-transducers 10 and 50 are calibrated by appropriate circuits 11 and 51, to produce signals 12 and 52 which are linearly and proportionately responsive to the absolute values of the measured temperature and pressure. Signals 12 and 52 are accepted by ADC 145, which outputs digital pulses 146 proportional to the quotient of signals 12 and 52, i.e. proportional to the ratio $Pm/Tm$. The formation of the ratio $Tb/Pb$ and the factor $Z$ is made in calibration circuits 11 and 51. Pulses 146 are measured and scaled by measuring and scaling circuits 1000 and the resulting pulses, 1100, represent corrected volume pulses. Corrected volume pulses 1100 are then added to a current total displayed in a useful form, or may be further manipulated suitably according to the user's needs.

Figure 6:
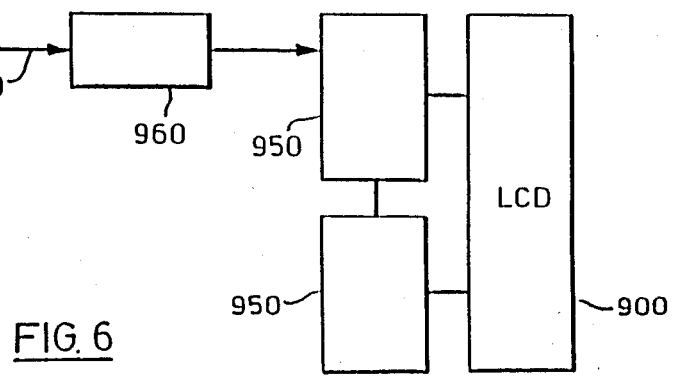
FIG. 6 is a block diagram of the display board.

In FIGS. 2 to 6, a correction device 1 is described which implements the system illustrated in FIG. 1. Correction device 1 is comprises three main boards, an analog board (FIG. 4), a digital board (FIG. 5) and a display board (FIG. 6).

Correction device 1 may be employed in connection with a rotary positive displacement meter 2 such as the ROMET 3000, manufactured by the applicant, as illustrated in FIG. 2. Interfacing meter 2 and correction device 1 is an associated electro-mechanical adaptor 3. Adaptor 3 is mechanically actuated by the rotation of pin 4 of meter 2, which in turn depends on the rotation of meter 2 impellers (not shown). Adapter 3 drives a mechanical display counter 6 for the uncorrected flow.

Figure 3:
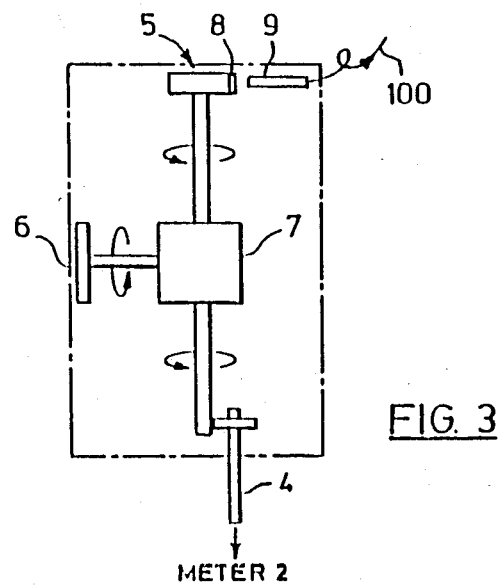
FIG. 3 is a side sectional schematic view of the electro-mechanical adaptor shown in FIG. 2.

In FIG. 3, a side view of adaptor 3, conventional gear and shaft assembly 7 is rotably driven by the orbit of pin 4. Gear and shaft assembly 7, normally employed in driving mechanical display counter 6 of the uncorrected volume, also rotably actuates pulse generator 5 in the following way.

Pulse generator 5 comprises an orbiting magnet 8, actuated by the rotation of assembly 7, and disposed laterally therefrom, a stationary reed switch 9 which is resiliently biased to the open position. Each orbit of magnet 8 momentarily closes reed switch 9 to generate a signal 100, and over a period of time, a sequence of analog signals 100 proportional to the uncorrected volume is thereby generated. It is understood that any suitable analog signal-producing volumetric flow transducer may be employed as long as there are means to produce a sequence of analog signals which correspond to a measured quantity of gas flowing through meter 2.

A more detailed discussion of the measurement and conditioning of the temperature and pressure parameters follows.

There is, in close proximity to each other and meter 2, temperature sensor-transducer 10 and pressure sensor-transducer 50, positioned downstream or upstream of meter 2 and exposed to the flowing gas (not shown).

Pressure sensor-transducer 10 emits, upon suitable calibration and scaling by conventional circuits 11, an analog signal 12 which is proportional to the absolute pressure of the gas and within the operational range of the normal input, Vin, of a suitable analog-digital converter ADC 145 (discussed below). Because supercompressibility can be approximated, with good practical results, as a linear function of pressure in the range of 0 to about 250 psig, calibration may be performed so that the supercompressibility factor is built into signal 12. That factor may be easily obtained from available tables for the pressure range of the pressure sensor-transducer 10 employed.

Temperature sensor-transducer 50 emits, upon suitable calibration and scaling by conventional circuits 51, an analog voltage signal 52 which is proportional to the absolute temperature of the gas and is within the operational range of the reference input, Vref, of ADC 145 (discussed below).

Figure 4:
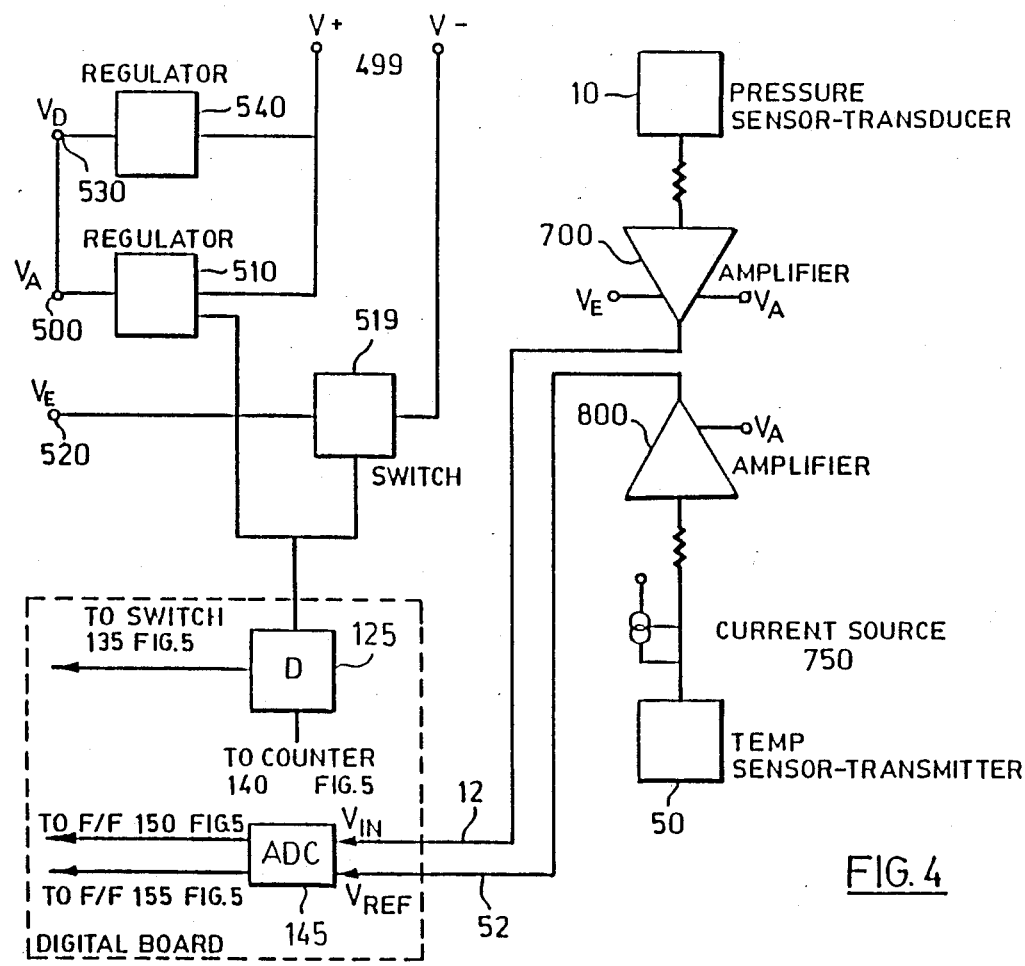
FIG. 4 is a block diagram of the analog board.

As seen in FIG. 4, the analog board block diagram, it is seen that the output of pressure sensor-transducer 10 is conditioned by amplifier and associated conventional circuitry 700 to provide signal 12 within the operating range of Vin, with reference to a voltage, Vbasepressure, corresponding to a preselected base pressure. Specifically, signal 12 is proportional to (measured pressure/base pressure)×Vbasepressure. Vbasepressure may be chosen depending on the pressure range of pressure sensor-transducer 10 employed.

Current source 750 and amplifier and associated circuitry 800 are employed in connection with temperature sensor-transducer 50 to provide a signal 52 within the operating range of Vref, with reference to voltage, Vbasetemperature, corresponding to a preselected base temperature. Specifically, signal 52 is (measured temperature/base temperature)×Vbasesetemperature.

The ratio Vbasetemperature/Vbasepressure is later employed to scale the quotient of signals 52 and 12, representing line pressure and temperature, to correspond to base temperature and pressure conditions. To facilitate construction of the necessary circuitry, it is preferable to set Vbasetemperature and Vbasepressure so that the product of said ratio and the full scale bit resolution of ADC 145 is an integer.

Amplifier 700 may be that manufactured by Precision Monolithics Inc. under designation AMP-01, and amplifier 800 may be that manufactured by GE/Intersil under designation ICL7621, or any other amplifiers with similar characteristics. Temperature sensor-transducer 50 may be that manufactured by National Semiconductor under designation LM135, or any other suitable device with similar characteristics. Pressure sensor-transducer 10 may employ Druck transducer PDCR 110/W, or any other suitable transducer with similar characteristics.

Continuing with FIG. 4, analog positive voltage Va 500 is fed by battery positive terminal 499 V+ at 6 volts, is regulated by regulator 510, and is enabled when a pulse is received from D flipflop 125 of the digital board (discussed below), in which case, Va 500 is then brought up to 6 volts. Analog negative voltage Ve 520 is fed by battery negative terminal 499 V− at −3 volts, is not regulated, is nominally at −3 volts and is also enabled by switch 519 when D flipflop 125 is triggered. Digital supply voltage Vd 530, regulated by regulator 540, is at 3.5 volts in standby mode. When analog power Va 500 is activated, Vd 530 is pulled to within 0.5 volts of Va 500. Ve, Va and Vd are conventionally employed in connection with the amplifiers, current sources, as partially illustrated in FIG. 4, and with the digital components of the digital board.

Regulators 510 and 540 may be those manufactured by GE/Intersil under designation ICL7663. Commercially available lithium batteries may be used to provide the above described voltages.

Figure 5:
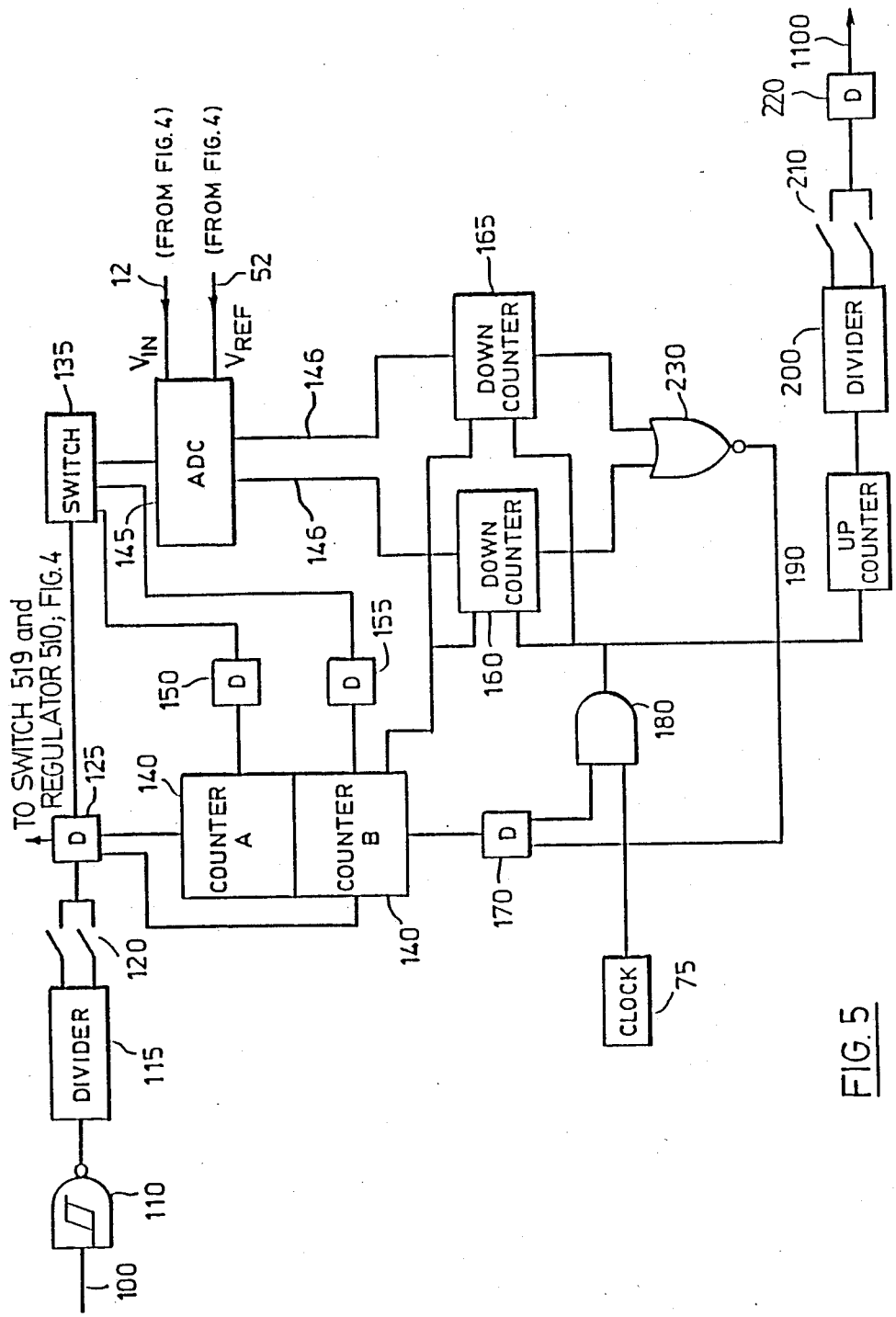
FIG. 5 is a block diagram of the digital board.

Turning to FIG. 5, the block diagram of the digital board, the system clock 75 produces a squarewave signal which is gated through AND gate 180. Pulses 100 arriving from pulse generator 5 are conditioned by a Schmitt circuit 110. Pulses 100 are then divided by divider circuits 115 by factors of ten, as can be manually set by dip switches 120. The division may be appropriate where it is desirable to reduce the number of pulses 100 to conserve battery consumption or where the particular meter gear and shaft assembly 7 generates pulses 100 too quickly for correction device 1 to handle timely. If such a division is performed at this stage, a corresponding multiplication should be effected later (by conventional circuits not shown).

The conditioned pulses 100 from dividers 115 set D flipflop 125. On each such pulse 100, a conversion process proceeds as follows.

The respective outputs of D flipflop 125 enable the analog power supply on the analog board and thereby the temperature and pressure sensors-transducers 10 and 50 (described above in connection with FIG. 4), enable analog switch 135 and start counter A of dual counter 140.

Analog switch 135 controls the control inputs to voltage analog-digital converter ADC 145. Pressure signal 12 is input at the normal input to ADC 145 (shown as Vin) and the conditioned temperature signal 52 is input at the reference input of ADC 145 (shown as Vref).

ADC 145 may be an 8 bit, 255 full scale resolution converter made by Oki Semiconductor under designation MSM5204RS but may be any analog-digital converter with similar linearity, repeatability, low power characteristics and one other characteristic, described next. An important characteristic of ADC 145 is that the input normally used as the reference voltage input, Vref, can accomodate sufficient variation of signal 52 inputted thereat, for the purposes described below. It should be noted that the manufacturer's specification of the operational range are often conservative, and operation at voltage levels outside the manufacturer's specified range is possible.

Dual counter 140 may be that manufactured by RCA under designation CD4518B or any other counter with similar characteristics. Counter A of dual counter 140, after a time delay approximately corresponding to the settling time of the analog board, triggers D flipflop 150, which in turn signals ADC 145 to begin conversion of input signals 12 and 52. The digital result of the conversion, output signal 146, is proportional to the quantity Pm/Tm. Specifically, output signal 146 represents $(255 \times Pm \times Tb \times Vbasepressure)/(Tm \times Pb \times Vbasetemperature)$.

After conversion, a signal is sent to D flipflop 155, which in turn activates Counter B of dual counter 140. Counter B of dual counter 140 then outputs a sequence of events as follows. Down counters 160 and 165 are triggered to receive the digital output signal 146 of ADC 145, with counter 160 holding the most significant bits, and counter 165 the least significant. Analog power on the analog board is turned off, to conserve drain on the batteries, by resetting D flipflop 125. D flipflop 150 is reset for the next conversion. D flipflop 170 is set which enables AND gate 180 to pass system clock 75 to down counters 160 and 165 and up counter 190 to begin counting down and up respectively. ADC 145 is prepared for the next conversion. Up counter 190 continues to count up until down counters 160 and 165 have counted down to zero, in which case, NOR gate 230 will decode their low carry outputs and reset D flipflop 170. The reset of D flipflop 170 disables the passing of the system clock 75 through to AND gate 180 and up counter 190 ceases counting.

The counting of up counter 190 require further explanation. Up counter 190 counts up and is reset whenever it reaches the value set by dividing or decoding circuit 200, as preset manually by appropriate link circuits and switches 210. The dividing is effected by conventional "divide by N" decoding circuitry, where N is the value 256×Vbasepressure/Vbasetemperature. It should be noted that the value 256 is chosen over 255, the true full scale resolution of ADC 145, merely for the convenience of construction of decoding circuits 200. If the small loss of accuracy resulting from this approximation is to be avoided, consideration may be given to adjusting Vbasepressure or Vbasetemperature so that N is an integer, or constructing suitable circuitry 200 for non-integer N. Down counters 160 and 165 may be those four bit counters manufactured by Solid State Scientific Inc. under designation SCL4029B. Up counter 190 may be a twelve bit counter manufactured by Solid State Scientific Inc. under designation SCL4040B.

The decoded pulses 1100 are sent through D flipflop 220 to the display board (described below). Because the decoded pulses 1100 from D flipflop 220 correspond to base pressure and base temperature conditions, the total number of decoded pulses 1100 during a countdown sequence of counters 160 and 165 equals the measured multiple of those base conditions, i.e. the digitized ratio (Pm/Tm)×(Tb/Pb)×Z. The remainder of each conversion is left in up counter 190, so that the next conversion begins with an initial, typically small, value. In this way, round off errors are not lost and overall accuracy will be improved as the number of conversions increase over time. .

Turning to FIG. 6, the display board block diagram, there is a liquid crystal display LCD 900 driven by two counter-drivers 950 in cascade formation. LCD 900 may be an 8 digit LCD manufactured by Epson America Inc. under designation LD-H-7919 or any other suitable LCD with similar characteristics. Counters-drivers 950 may be those 4 digit ones manufactured by Maxim Integrated Products Inc. under designation MM74C945. Pulses 1100 from the digital board are appropriately conditioned through buffer and filter circuits 960 before they are fed into the first counter-driver 950, which operates in a master-slave relationship with second counter 950. In this way, corrected volume pulses are totalled and displayed in a useful manner.

Referring to FIG. 7, the timing diagram, the first three time lines show a pulse from Schmitt circuit 100 setting D flipflop 125 and turning on the analog board. In the fourth and fifth time lines, counter A of dual counter 140 is also set after the analog board has settled and simultaneously, ADC 145 begins conversion of its temperature and pressure inputs. The end of conversion of ADC 145 triggers counter B of dual counter 140 and loads down counters 160 and 165, as seen in sixth, seventh and eigth time lines. Counter B then shuts off the analog board and starts down counters 160 and 165, as seen in the third and nineth time lines, and later shuts off ADC 145. Simultaneous with the commencement of down counters 160 and 165, up counter 190 begins to counts in cycles of 64 pulses and sends out one pulse per cycle to the display, as seen in the eleventh and twelveth time lines. (The cycle of 64 has been chosen to correspond to the example, next provided). Down counters 160 and 165 eventually reach zero, in which case, up counter 190 ceases, as seen in the tenth and eleventh time lines.

Figure 8:
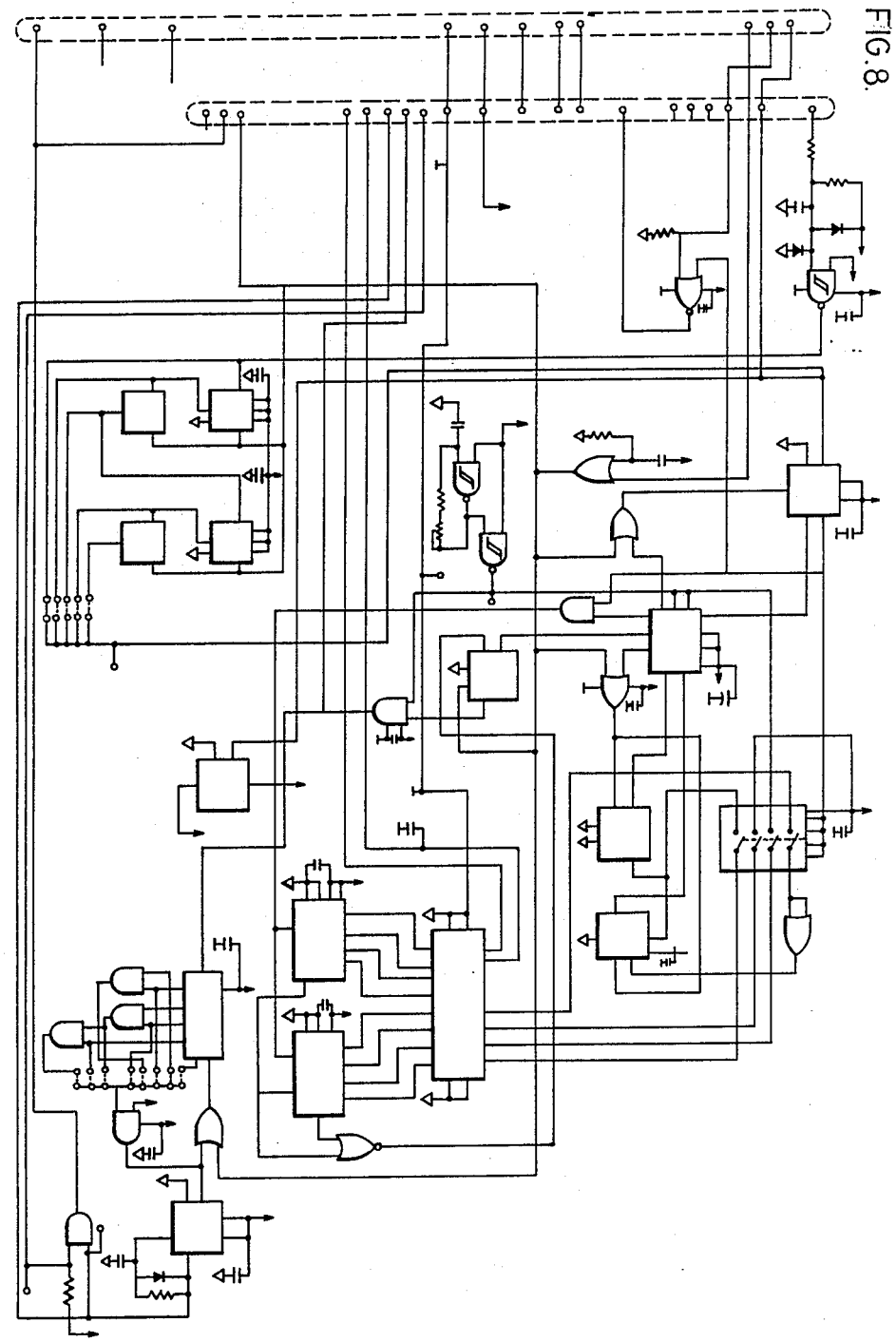
FIG. 8 is a schematic diagram of the digital board.

FIG. 8 is a detailed schematic of the digital board, whose operation is self-evident and requires no further explanation.

The operation of the above described system, with the electronic components designated, is now illustrated by way of example.

In meter 2, pin 4 will rotate once for every 10 cubic feet of measured uncorrected flow. The base conditions will be those used in North America, 14.73 psia and 60 degrees F. Line pressure will be 38 psia and line temperature will be 48 degrees F. The pressure range of the pressure sensor-transducer 10 will be 0 to 50 psia, and for simplicity, the supercompressibility factor will be unity.

After suitable calibration to yield 1 volt at base pressure of 14.73 psia, pressure transducer output signal 12, corresponding to line pressure of 38 psia, would be 1 volt×38 psia/14.73 psia=2.580 volts, which is input into ADC 145 at Vin. Temperature sensor-transducer 50 is calibrated to output 10 millivolts per degree K., so that the line temperature of 48 degrees F. would be represented by 2.8204 volts and the base temperature of 60 degrees F. would be represented by 2.8871 volts. After calibration to produce 4 volts at base temperature, signal 52 would be 4 volts×2.8204/2.8871=3.9076 volts at the Vref input of ADC 145.

After pin 4 of meter 2 rotates once and commences the operation described above, ADC 145, with 255 bit full scale resolution, will convert the ratio of input voltages as 255×Vin/Vref=169, the nearest digit.

Dividing or decoding circuit 200 is set for the pressure range of the pressure sensor-transducer employed, 0 to 50 psia, and decodes as follows. Dividing circuit 200 is manually set for division by 64 (=256/(Vbasepressure/Vbasetemperature) so that on each cycle of 64, up counter 190 will be reset and one pulse will be added to display counter/driver 950, containing the corrected total. In this example, up counter 190 provides the correction factor 169/64=2.6406=correction factor. (Note that the theoretical correction factor in this example would be 2.6408=(38 psia/14.73 psia)×(282.04 degrees K)). Therefore, two correction pulses would be sent to display counter/driver 950, and the remainder of 41 (=169−128) is left in up counter 190 to begin the next conversion with. Reference is made to the eleventh and twelveth time lines of FIG. 7. In this way, one uncorrected volume pulse, representing ten cubic feet of gas flow, has been replaced with two corrected pulses, representing, more accurately, twenty cubic feet of gas flow. As sampling and conversion according to the above described system continues, the accuracy improves.

It should be noted that the possibilities of Vbasepressure is limited by the pressure range of sensor-transducer 10 and operational range of Vin input of ADC 145. The wider the pressure range, the lower Vbasepressure must be to accomodate variation within the operational range of the Vin input of ADC 145. Similar constraints operate for the setting of Vbasetemperature.

Configurations where the signal converting and correction circuitry is remotely connected from the temperature and pressure sensors, require lengthy connecting circuitry and suffer from various disadvantages which can cause distortions: variation in the impedance in the leads of such connection circuitry, leakage resistance between cable leads or direct short circuits between the leads or to ground, and ambient conditions surrounding the cable leads. While it is advantageous for the above reasons to position the sensors-transducers 10 and 50 near correction device 1, it is not imperative. Their remote positioning does not affect the present invention if connection circuitry difficulties are not present or are rectified.

Alternative variations to the above embodiment may be easily obtained where the uncorrected volume is to be corrected for only pressure or only temperature. For the temperature-only correction, amplifier 700 may be adjusted to 3.25 volts to provide, instead of a live pressure input, a fixed pressure voltage input 12 to ADC 145 at Vin. It has been found that for the above described components and circuitry, 3.25 volts is a suitable voltage level. However, for other circuits, other voltage levels may be found according to the characteristics of the ADC employed. For the pressure-only correction, amplifier 800 may be adjusted to 4 volts to provide, instead of a live temperature input, a fixed temperature input 52 to ADC 145 at Vref. Further, the analog board may accomodate optocouplers. It is understood that the values described above (4 volts, 1 volt, etc.) are not important in themselves, for they have been chosen partly because they simplify the explanations. It is their relationship which is critical.

There has been disclosed a method and device for electronically correcting gas meters. It will be apparent to those skilled in the art that the above-described embodiment is merely illustrative of the principles of the present invention. Numerous other embodiments may be devised without departing from the scope of the invention, as defined in the following claims.

I claim:

1. An electronic device for correcting a gas meter which generates a sequence of analog flow pulses proportional to the uncorrected, mechanically measured flow of gas therethrough, comprising:
    (a) flow input means, connected to the gas meter, for receiving an analog flow pulse;
    (b) pressure indicating means, exposed to the gas, connected to the gas meter and responsive to the analog flow pulse, for measuring the pressure of the gas and generating a first analog signal proportional to the absolute value thereof;
    (c) temperature indicating means, exposed to the gas, connected to the gas meter, and responsive to the analog flow pulse, for measuring the temperature of the gas and generating a second analog signal proportional to the absolute value thereof;
    (d) an analog to digital converter (ADC), responsive to the analog flow pulse, having: (i) first input means, connected to said pressure indicating means, for accepting said first analog signal; (ii) second input means, connected to said temperature indicating means, for accepting said second analog signal, wherein said second input means, normally being the reference input to said ADC, is adapted to accept a varying input; and (iii) conversion means, connected to said first and second input means, for producing a digital output proportional to the quotient of said first analog signal and said second analog signal;
    (e) conversion means, connected to said ADC and responsive to said digital output, for converting said digital output to produce a sequence of corrected volume pulses proportional to the measured flow, corrected for temperature and pressure.

2. A device according to claim 1, wherein said pressure indicating means includes pressure calibration means for calibrating said first analog signal with reference to a preselected base pressure, and wherein said temperature indicating means includes temperature calibration means for calibrating said second analog signal with reference to a preselected base temperature, and wherein said conversion means includes calibration means for scaling said digital output to correspond to said preselected base temperature and said preselected base pressure.

3. A device according to claim 2, wherein said scaling means includes a first digital counter which receives said digital output and counts down to zero, and a second digital counter which repetitively counts up, while said first digital counter is counting down, in units appropriate to scale said digital output to correspond to said preselected base temperature and said preselected base pressure.

4. A device according to claim 3, wherein said units are proportional to the full scale bit resolution of said ADC and the quotient of said base temperature and base pressure.

5. A device according to claim 4, wherein operation of said temperature indicating means and said pressure indicating means are suspended responsively to said digital output.

6. A device according to claim 5, further including a dividing circuit, connected to said flow input means, for dividing the sequence of analog flow pulses by a preselected factor, and a corresponding multiplying circuit, connected to said conversion means, for multiplying said sequence of corrected volume pulses by said preselected factor.

7. A device according to claim 6, wherein said pressure indicating means comprises supercompressibility calibration means for adjusting said first analog signal to be proportional to the product of the measured pressure of the flowing gas and the supercompressibility factor of the flowing gas, which supercompressibility factor is obtained conventionally.

8. A device according to claim 7, wherein said conversion means includes counting means for counting said sequence of corrected volume pulses and display means, connected to and driven by said counting means, for displaying output of counting means.

9. An electronic device for correcting a gas meter which generates a sequence of analog flow pulses proportional to the uncorrected, mechanically measured flow of gas therethrough, comprising:
    (a) flow input means, connected to the gas meter, for receiving an analog flow pulse;
    (b) pressure indicating means for generating a preselected constant first analog signal;
    (c) temperature indicating means, exposed to the gas, connected to the gas meter, and responsive to the analog flow pulse, for measuring the temperature of the gas and generating a second analog signal proportional to the absolute value thereof;
    (d) an analog to digital converter (ADC), responsive to the analog flow pulse, having: (i) first input means, connected to said pressure indicating means, for accepting said constant first analog signal; (ii) second input means, connected to said temperature indicating means, for accepting said second analog signal, wherein said second input means, normally being the reference input to said ADC, is adapted to accept a varying input; and (iii) conversion means, connected to said first and second input means, for producing a digital output proportional to the quotient of said first analog signal and said second analog signal;
    (e) conversion means, connected to said ADC and responsive to said digital output, for converting said digital output to produce a sequence of corrected volume pulses proportional to the measured flow, corrected for temperature and pressure.

10. A device according to claim 9, wherein said pressure indicating means includes pressure calibration means for calibrating said first analog signal with reference to a preselected base pressure, and wherein said temperature indicating means includes temperature calibration means for calibrating said second analog signal with reference to a preselected base temperature, and wherein said conversion means includes calibration means for scaling said digital output to correspond to said preselected base temperature and said preselected base pressure.

11. A device according to claim 10, wherein said scaling means includes a first digital counter which receives said digital output and counts down to zero, and a second digital counter which repetitively counts up, while said first digital counter is counting down, in units appropriate to scale said digital output to correspond to said preselected base temperature and said preselected base pressure.

12. A device according to claim 11, wherein said units are proportional to the full scale bit resolution of said ADC and the quotient of said base temperature and base pressure.

13. A device according to claim 12, wherein operation of said temperature indicating means and said pressure indicating means are suspended responsively to said digital output.

14. A device according to claim 13, further including a dividing circuit, connected to said flow input means, for dividing the sequence of analog flow pulses by a preselected factor, and a corresponding multiplying circuit, connected to said conversion means, for multiplying said sequence of corrected volume pulses by said preselected factor.

15. A device according to claim 14, wherein said pressure indicating means comprises supercompressibility calibration means for adjusting said first analog signal to be proportional to the product of the measured pressure of the flowing gas and the supercompressibility factor of the flowing gas, which supercompressibility factor is obtained conventionally.

16. A device according to claim 15, wherein said conversion means includes counting means for counting said sequence of corrected volume pulses and display means, connected to and driven by said counting means, for displaying output of counting means.

17. An electronic device for correcting a gas meter which generates a sequence of analog flow pulses proportional to the uncorrected, mechanically measured flow of gas therethrough, comprising:
  (a) flow input means, connected to the gas meter, for receiving an analog flow pulse;
  (b) pressure indicating means, exposed to the gas, connected to the gas meter and responsive to the analog flow pulse, for measuring the pressure of the gas and generating a first analog signal proportional to the absolute value thereof;
  (c) temperature indicating means for generating a preselected constant second analog signal;
  (d) an analog to digital converter (ADC), responsive to the analog flow pulse, having: (i) first input means, connected to said pressure indicating means, for accepting said first analog signal; (ii) second input means, connected to said temperature indicating means, for accepting said second analog signal, wherein said second input means, normally being the reference input to said ADC, is adapted to accept a varying input; and (iii) conversion means, connected to said first and second input means, for producing a digital output proportional to the quotient of said first analog signal and said second analog signal;
  (e) conversion means, connected to said ADC and responsive to said digital output, for converting said digital output to produce a sequence of corrected volume pulses proportional to the measured flow, corrected for temperature and pressure.

18. A device according to claim 17 wherein said pressure indicating means includes pressure calibration means for calibrating said first analog signal with reference to a preselected base pressure, and wherein said temperature indicating means includes temperature calibration means for calibrating said second analog signal with reference to a preselected base temperature, and wherein said conversion means includes calibration means for scaling said digital output to correspond to said preselected base temperature and said preselected base pressure.

19. A device according to claim 18, wherein said scaling means includes a first digital counter which receives said digital output and counts down to zero, and a second digital counter which repetitively counts up, while said first digital counter is counting down, in units appropriate to scale said digital output to correspond to said preselected base temperature and said preselected base pressure.

20. A device according to claim 19, wherein said units are proportional to the full scale bit resolution of said ADC and the quotient of said base temperature and base pressure.

21. A device according to claim 20, wherein operation of said temperature indicating means and said pressure indicating means are suspended responsively to said digital output.

22. A device according to claim 21, further including a dividing circuit, connected to said flow input means, for dividing the sequence of analog flow pulses by a preselected factor, and a corresponding multiplying circuit, connected to said conversion means, for multiplying said sequence of corrected volume pulses by said preselected factor.

23. A device according to claim 22, wherein said pressure indicating means comprises supercompressibility calibration means for adjusting said first analog signal to be proportional to the product of the measured pressure of the flowing gas and the supercompressibility factor of the flowing gas, which supercompressibility factor is obtained conventionally.

24. A device according to claim 23, wherein said conversion means includes counting means for counting said sequence of corrected volume pulses and display means, connected to and driven by said counting means, for displaying output of counting means.

25. A method for correcting a mechanical gas meter which provides a measure of the volume of the flow of gas, comprising the steps of:
  (a) receiving the measure and generating a sequence of analog flow pulses proportional thereto;
  (b) measuring the pressure of the gas and generating first analog signal proportional to value thereof;
  (c) measuring the temperature of the gas and generating second analog signal proportional to value thereof;
  (d) in response to said analog flow pulses, producing a sequence of digital signals corresponding to and proportional to the quotient of the said first analog signal and said second analog signal, by means of an analog to digital converter (ADC), wherein said first analog signal is inputed into the normal input of said ADC and second analog signal is inputted at the reference input to said ADC, which is adapted to accept a varying analog input signal;

(e) converting said sequence of digital signals to correspond to preselected base temperature and base pressure conditions;

(f) displaying said converted sequence of digital signals.

* * * * *